(12) United States Patent
Elcock et al.

(10) Patent No.: US 11,873,830 B2
(45) Date of Patent: Jan. 16, 2024

(54) DRY GAS SEAL INCLUDING OIL REPELLANT SURFACE

(71) Applicant: John Crane UK Limited, Slough (GB)

(72) Inventors: Simon Elcock, Brynaman (GB); Klaus-Dieter Meck, Manchester (GB); Tomasz Rybak, Wantage (GB)

(73) Assignee: JOHN CRANE UK LIMITED, Slough (GB)

( * ) Notice: Subject to any disclaimer, the term of this patent is extended or adjusted under 35 U.S.C. 154(b) by 105 days.

(21) Appl. No.: 16/992,296

(22) Filed: Aug. 13, 2020

(65) Prior Publication Data

US 2021/0048035 A1  Feb. 18, 2021

Related U.S. Application Data

(60) Provisional application No. 62/887,837, filed on Aug. 16, 2019.

(30) Foreign Application Priority Data

Dec. 16, 2019  (GB) ...................................... 1918551

(51) Int. Cl.
  *F04D 29/12*  (2006.01)
  *F16J 15/34*  (2006.01)
  *F16J 15/40*  (2006.01)

(52) U.S. Cl.
  CPC ............ *F04D 29/124* (2013.01); *F16J 15/34* (2013.01); *F16J 15/40* (2013.01); *F05D 2240/55* (2013.01)

(58) Field of Classification Search
  CPC ......... F04D 29/124; F04D 29/12; F16J 15/34; F16J 15/40; F16J 15/346; F16J 15/348; F16J 15/3496; F16J 15/4472; F05D 2240/55; F05D 2300/43; F05D 2300/512; F01D 11/04
  USPC ........................................................ 415/111
  See application file for complete search history.

(56) References Cited

U.S. PATENT DOCUMENTS

| | | |
|---|---|---|
| 8,753,014 B2 | 6/2014 | Devitt |
| 9,441,668 B2 | 9/2016 | Devitt |
| 10,030,666 B2 | 7/2018 | Devitt |
| 10,100,932 B2 | 10/2018 | Devitt |

(Continued)

FOREIGN PATENT DOCUMENTS

| | | |
|---|---|---|
| GB | 1550919 | 8/1979 |
| JP | 2012037035 A | 2/2012 |
| WO | 2009015855 A1 | 2/2009 |

OTHER PUBLICATIONS

GB Search Report for Application No. 1918551.1, dated May 11, 2020, 4 pages.

(Continued)

*Primary Examiner* — Yi-Kai Wang
(74) *Attorney, Agent, or Firm* — CANTOR COLBURN LLP

(57) ABSTRACT

A dry gas seal includes a mating ring that can be coupled a the rotating shaft to rotate with the rotating shaft, a retainer ring that can be fixedly attached to the compressor and a carrier ring moveably coupled to the retainer ring. The carrier ring including a primary ring carrying face, a rear face and a sealing surface extending between the primary ring carrying face and the rear face. The sealing surface including an oleophobic coating disposed thereon.

15 Claims, 7 Drawing Sheets

(56) References Cited

U.S. PATENT DOCUMENTS

| | | | | |
|---|---|---|---|---|
| 2009/0066033 A1* | 3/2009 | Lusted | ................... | F16J 15/406 277/411 |
| 2010/0195946 A1 | 8/2010 | Zhou et al. | | |
| 2010/0201074 A1* | 8/2010 | Haynes | ................ | F16J 15/441 277/379 |
| 2010/0283210 A1* | 11/2010 | Kirchner | ............. | F16J 15/3452 277/377 |
| 2012/0033330 A1 | 2/2012 | Mizukami et al. | | |
| 2014/0286599 A1 | 9/2014 | Devitt et al. | | |
| 2014/0341733 A1* | 11/2014 | Lebigre | ................ | F16J 15/3412 277/411 |
| 2018/0100582 A1 | 4/2018 | Li et al. | | |
| 2018/0328494 A1 | 11/2018 | Rouillon | | |
| 2019/0002044 A1* | 1/2019 | Haas | ...................... | B22F 5/106 |
| 2019/0049019 A1 | 2/2019 | Devitt | | |
| 2019/0178386 A1 | 6/2019 | Arai | | |
| 2019/0390776 A1* | 12/2019 | Forrest | ..................... | F16J 15/40 |
| 2020/0400094 A1* | 12/2020 | Singh | ........................ | F01L 3/22 |

OTHER PUBLICATIONS

Greener Design Staff, "Purdue Scientists Develop 'Self-Cleaning' Coatings that Repel Oil" Aug. 18.2019; Retreived at http://www.greenbiz.com/news/2009/08/18/purdue-scientists-develop-self-cleaning-coatings-repel-oil. Retrieved on Aug. 13, 2020, 3 pages.

John Crane T28 XP Dry Gas Seal.

Notification of Transmittal of the International Search Report of the International Searching Authority, or the Declaration; PCT/IB2020/057650; dated Nov. 2, 2020, 6 pages.

Notification of Transmittal of the International Writtion Opinion of the International Searching Authority, or the Declaration; PCT/IB2020/057650; dated Nov. 2, 2020, 9 pages.

Notification of Transmittal of the International Preliminary Report on Patentability of the International Searching Authority; PCT/IB2020/057650; dated Mar. 3, 2022, 9 pages.

* cited by examiner

… (1)

DRY GAS SEAL INCLUDING OIL REPELLANT SURFACE

CROSS REFERENCE TO RELATED APPLICATIONS

This application claims the benefit of an earlier filing date from U.S. Provisional Application Ser. No. 62/887,837 filed Aug. 16, 2019 and United Kingdom Application No. 1918551.1 filed Dec. 16, 2019, the entire disclosure of which is incorporated herein by reference.

BACKGROUND

Exemplary embodiments pertain to the art of dry gas seals and, in particular to dry gas seals that include one or components thereof having an oil repellant substance disposed thereon.

Dry gas seals are typically used to seal centrifugal compressors that are often used in transportation and distribution of gasses such as natural gas. For instance, in a natural gas pipeline, compressors may be located at set intervals to boost the gas pressure for processing, to counter the effect of flow losses along the transmission pipelines, and to generally keep the gas moving towards its destination.

To move natural gas or other fluids, centrifugal compressors use a rotating disk or impeller contained in a housing to increase the pressure of a process gas. The rotation of the disk/impeller is provided by a rotating shaft that is driven by an external motor or turbine. The shaft can be mated to the rotor of the compressor that carries the disk/impeller. Dry gas seals surround the rotor at or near where the rotor enters housing to form a seal that prevents the process gas from escaping at that location.

In general, dry gas seals operate by providing a seal between a rotating ring and a stationary ring. The rotating ring is sometimes referred to as a "mating ring" as it is mated to the rotating shaft/rotor. The rotating ring can be mated to the rotor via a shaft sleeve. The stationary ring can sometimes be referred to as the primary ring and does not rotate during operation.

In operation, a layer of gas is developed between the two rings that forms a seal while allowing the rings to move relative to one another without contacting each other. The gas layer is formed from process or sealing gas injected into the dry gas seal. Grooves in the rotating (mating) ring draw the process gas from an outer radial edge of the mating ring to a location in between the two rings. The process gas that is drawn into the grooves is compressed as is moves toward the radially inward ends (or tips) of the grooves. The compressed gas creates a pressure dam that causes the primary ring to "lift off" from the mating ring to form a running gap that is in the range of few microns (e.g., 3-10 µm). To allow for relative axial movement between the rings, the primary ring is typically mounted to a stationary portion of the dry gas seal by a compressible member such as a spring or other implement. After liftoff, a very small amount of the process gas flows over the dam area to the low pressure side of the seal (e.g., outside of the compressor), creating a controlled seal leakage, and the rings operate on the thin film of gas as a non-contacting seal.

SUMMARY

Disclosed in one embodiment is dry gas seal to seal process gas in a compressor that includes a rotating shaft. The dry gas seal includes: a mating ring that can be coupled to the rotating shaft to rotate with the rotating shaft; a retainer ring that can be fixedly attached to the compressor; and a carrier ring moveably coupled to the retainer ring. The he carrier ring including a primary ring carrying face, a rear face and a sealing surface extending between the primary ring carrying face and the rear face. The sealing surface including an oleophobic coating disposed thereon.

In the dry gas seal of any prior embodiment, the seal can further include: a primary ring attached to the primary ring carrying face.

The dry gas seal of any prior embodiment can further include: a biasing member that movably couples the carrier ring to the retainer ring; and a sealing element disposed between the retainer ring and the carrier ring that contacts the oleophobic coating disposed on the sealing surface.

In the dry gas seal of any prior embodiment the sealing element can be a polymer or elastomer seal. In particular, the seal can be a lip seal.

In the dry gas seal of any prior embodiment a portion of the retainer ring includes the oleophobic coating disposed thereon.

In the dry gas seal of any prior embodiment the seal can further include a sleeve ring that is coupled to the rotating shaft and carries the mating ring.

In the dry gas seal of any prior a radially outward surface of the sleeve ring includes the oleophobic coating disposed thereon The dry gas seal of any embodiment can be provided in combination with a separation seal, the separation seal including the oleophobic coating disposed thereon.

In the dry gas seal of any prior embodiment, the seal is in combination with a compressor. In such an embodiment, the dry gas seal is disposed in a bore formed in a housing of the compressor and provides process gas received through the compressor housing to the primary ring.

In a multi-stage dry gas seal embodiment, a dry gas seal to seal process gas in a compressor that includes a rotating shaft is disclosed. In such multi-stage dry gas seal, the dry gas seal includes a first stage seal and a second stage seal. The first stage seal includes: a first mating ring that can be coupled to the rotating shaft to rotate with the rotating shaft; a first retainer ring that can be fixedly attached to the compressor; and a first carrier ring moveably coupled to the first retainer ring, the first carrier ring including a first primary ring carrying face, a first carrier ring rear face and a first carrier ring sealing surface extending between the first primary ring carrying face and the first carrier ring rear face. The second stage seal includes a second stage seal including: a second mating ring that can be coupled to the rotating shaft to rotate with the rotating shaft; a second retainer ring that can be fixedly attached to the compressor; and a second carrier ring moveably coupled to the second retainer ring, the second carrier ring including a second primary ring carrying face, a second carrier ring rear face and a sealing surface extending between the second primary ring carrying face and the rear face. At least one of the first carrier ring sealing surface and the second carrier ring sealing surface includes an oleophobic coating disposed thereon.

In a multi-stage dry gas seal of any prior embodiment, the seal further includes a first primary ring attached to the first primary ring carrying face; and a second primary ring attached to the second primary ring carrying face.

In a multi-stage dry gas seal of any prior embodiment, the first carrier ring sealing surface includes the oleophobic coating, the dry gas seal further comprising: a first biasing member that movably couples the first carrier ring to the first retainer ring; and a first sealing element disposed between the first retainer ring and the first carrier ring that contacts the oleophobic coating disposed on the first carrier ring sealing surface.

In a multi-stage dry gas seal of any prior embodiment, the first sealing element is a polymer or elastomer seal.

In a multi-stage dry gas seal of any prior embodiment, the second carrier ring sealing surface includes the oleophobic coating, the dry gas seal and further comprising: a second biasing member that movably couples the second carrier ring to the second retainer ring; and a second sealing element disposed between the second retainer ring and the second carrier ring that contacts the oleophobic coating disposed on the second carrier ring sealing surface.

In a multi-stage dry gas seal of any prior embodiment, the second sealing element is a polymer or elastomer seal.

In a multi-stage dry gas seal of any prior embodiment, the seal further includes: a labyrinth seal disposed fluidly between the first seal and the second seal. the labyrinth seal can include the oleophobic coating disposed thereon.

Also disclosed is a method of repairing a dry gas seal, the dry gas seal including an a gas inlet that allows process gas to enter the dry gas seal and a cartridge that includes a mating ring that can be coupled to a rotating shaft to rotate with the rotating shaft, a retainer ring that can be fixedly attached to a compressor housing and a carrier ring moveably coupled to the retainer ring, the carrier ring including a primary ring carrying face, a rear face and a sealing surface extending between the stationary ring carrying face and the rear face. The method includes: removing the carrier ring from the outer housing; replacing the carrier ring with a treated carrier ring, the treated carrier ring including an oleophobic coating disposed thereon.

In any prior method, replacing can include disposing the oleophobic coating on the sealing surface of the carrier ring to form the treated carrier ring.

In any prior method, replacing can include disposing the oleophobic coating on a sealing surface of a replacement carrier ring to form the treated carrier ring.

Disclosed in a second dry gas seal embodiment is a dry gas seal to seal process gas in a compressor that includes a rotating shaft. The seal of the second embodiment includes: a mating ring that can be coupled to the rotating shaft to rotate with the rotating shaft; a retainer that can be fixedly attached to the compressor, the retainer including a main body and an extension that extends outward from the main body; a pusher ring moveably coupled to the retainer; and a sealing element disposed between the pusher ring and the extension. The extension can include an oleophobic coating disposed thereon.

In any prior embodiment of the second dry gas seal embodiment, the extension can include a radially outward surface, an axially inward surface, and a radially inward surface.

In any prior embodiment of the second dry gas seal embodiment, the oleophobic coating can be disposed on the radially outward surface.

In any prior embodiment of the second dry gas seal embodiment, the oleophobic coating can be disposed on one or more of a radially outward surface, an axially inward surface, and a radially inward surface.

In any prior embodiment of the second dry gas seal embodiment, the main body includes an axially outward surface, wherein the axially outward surface includes the oleophobic coating disposed thereon.

In any prior embodiment of the second dry gas seal embodiment, the seal can further includes a primary ring attached to the pusher ring.

In any prior embodiment of the second dry gas seal embodiment, the seal can include: a biasing member that movably couples the pusher ring to the retainer, and the sealing element contacts the oleophobic coating disposed on the extension.

In any prior embodiment of the second dry gas seal embodiment, the sealing element can be a polymer or elastomer seal.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
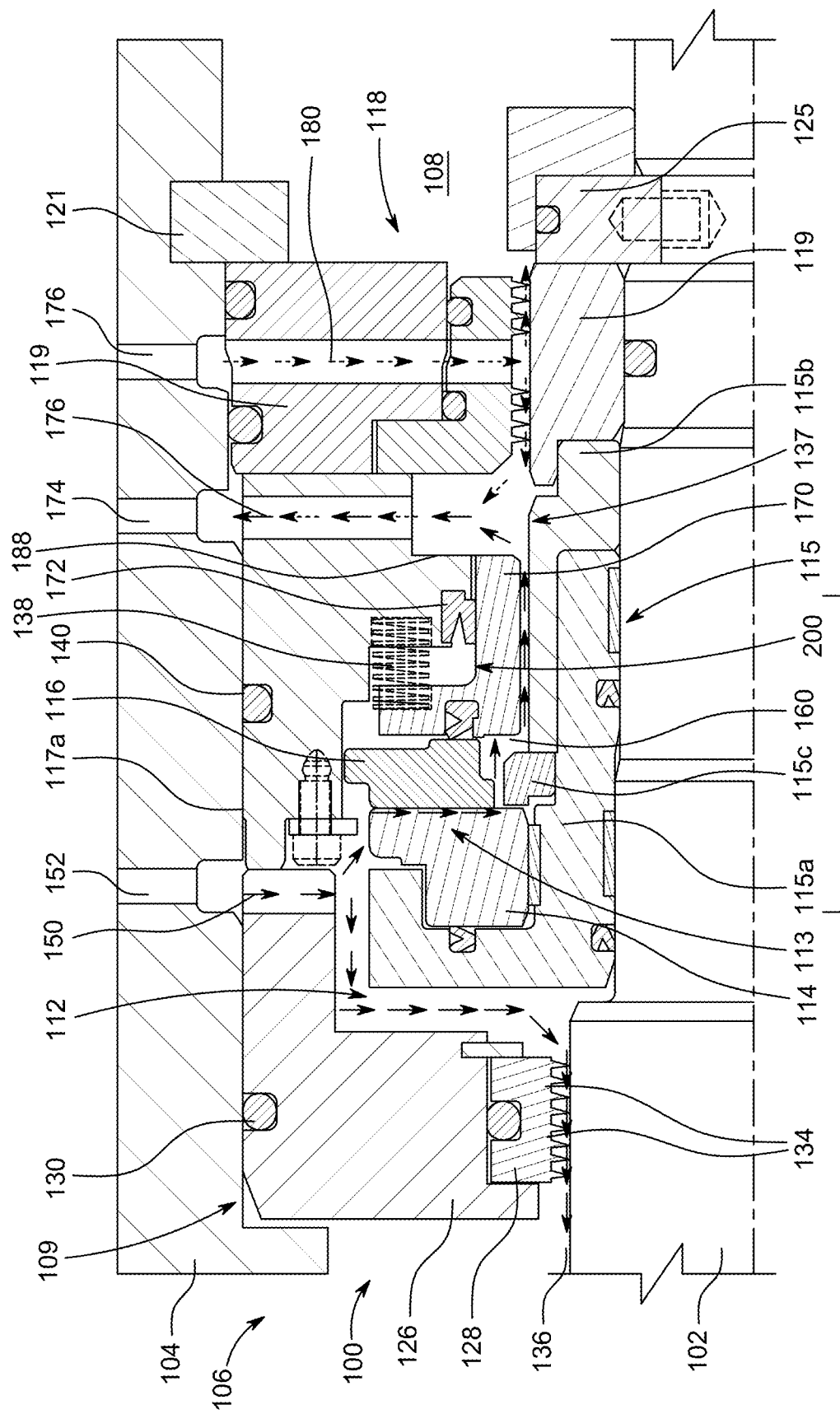
FIG. 1 is a cross-sectional view of a single dry gas seal disposed into a compressor housing.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

A detailed description of one or more embodiments of the disclosed apparatus and method are presented herein by way of exemplification and not limitation with reference to the Figures.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

Turning now to an overview of technologies that are more specifically relevant to aspects of the invention, one or more portions of a dry gas seal can be coated with an oleophobic coating to reduce or eliminate adhesion of either oil or water (or both) thereon.

The principle of oleophobic coatings is based on the lotus effect The lotus effect refers to water repellency shown in a lotus leaf, where the dirt is picked up by water droplets due to the surface architecture minimizing the adhesion between the water and the leaf. The phenomenon is based on changing the contact angles of droplets, surface tension and work of adhesion on the surface.

In the above description of how dry gas seals operate it was assumed that the process gas is free from liquids. However, in some case, the process gas (or other gases introduced into the dry gas seal) can include fluids (e.g., oil or oil by-products) that can cling to metal parts in the dry gas seal resulting in the formation of a condensate. This problem can be especially prevalent when the process gas is insufficiently heated before being introduced into the dry gas seal.

Such condensate formation increases component temperatures and, in some instances, the build-up of deposits as a result of fluids adhering to a surface in the dry gas seal. In extreme cases, these deposits can limit the movement of parts and causes failure of the entire seal. As will be better understood after reviewing the discussion of dry gas seal operation below, the limitation on movement of parts can be referred to as "hang-up" herein. One or more embodiments herein provide a technical solution that reduces or eliminates hang-up by providing an oleophobic coating at a location between two parts of a dry gas seal where at least one of them moves relative to one another. The oleophobic coating can, in such cases, reduce the above described deposits and thus, the hang-up.

FIG. 1 is a partial cross-sectional view of the single non-contacting dry gas seal assembly 100 (or dry gas seal assembly for short). The teachings herein can be applied, however, to other dry gas seal configurations. As will be understood after reading the detailed description, the teachings herein can be applied to any type of dry gas seal including, without limitation single dry gas seals, tandem dry gas seals, tandem dry gas seals with intermediate an intermediate labyrinth, triple seals with or without a labyrinth and double opposed dry gas seals.

At least a portion of the dry gas seal assembly 100 is positioned between a rotating compressor shaft 102 and a compressor housing 104. The rotating compressor shaft 102 is generally part of a compressor and is operably coupled to a compressor impeller (not shown) disposed in a process cavity 106 of the compressor, and is supported by the housing 104 via a bearing (not shown) disposed in a bearing cavity 108 of the housing 104. The rotating compressor shaft 102 is the rotor of the compressor in most instances and may be referred to simply as a rotating shaft from time to time herein. It shall be understood that the rotating shaft need not be the rotor of the compressor itself but could be any shaft connected to the rotor that rotates with it around which a seal needs to be provided.

The compressor housing 104 includes a bore 109 formed in it that extends between a process cavity 106 and a bearing cavity 108 and defines an annular seal chamber 112 into which the dry gas seal assembly 100 may be inserted. The process cavity 106 includes the gas (typically a hydrocarbon) being compressed by the compressor. That gas is referred to as process gas herein.

A shroud 126 that may include a labyrinth seal and which extends over a radially extending opening formed between the rotating shaft 102 and the compressor housing 104 may be provided to inhibit the free flow of process gas from the process cavity 106 into the bore 109. The shroud 126 is disposed in the bore 109 and, as illustrated carries a labyrinth seal 128 that serves to totally or partially prevent the free flow of process gas from the process cavity 106 into the bore 109. The combination of the shroud 126 and the labyrinth seal 128 extends over a radially extending opening formed between the rotating shaft 102 and the compressor housing 104. As illustrated, the shroud 126 and the labyrinth seal 128 are shown as two separate items but they could be formed as an integrated unit in one embodiment. A seal such as a radial compression seal 130 can be provided to seal between the shroud 126/labyrinth seal 128 combination and the compressor housing 104 to ensure process gas does not escape from the process cavity 106.

At its radially inner end, the labyrinth seal 128 includes a plurality of ridges 134. In operation, the ridges 134 are disposed close to an outer surface 136 of the rotating shaft 102. The plurality of ridges 134 and the corresponding intermediate cavities formed between any two consecutive ridges 134 impede the ingress of gas from the process cavity 106 into the seal chamber 112 by way of the rotating shaft 102.

The dry gas seal assembly 100 illustrated in FIG. 1 includes a single dry gas seal that is generally referenced as first seal 110. Typically the components of the first seal 110 are preassembled into a cartridge and then disposed in the seal chamber 112. The cartridge 118 includes a stator 117 that can be formed of one or more components and joined in a fixed relationship to one another as well as with the compressor housing 104 when installed. As shown, the stator 117 includes a retainer ring 117a that can be sealed to the compressor housing 104 by a sealing element such as a radial seal 140.

The cartridge 118 can also include a sleeve ring 115 that can be formed of one or more components and that that is attached to the rotating shaft 102 such that it rotates with the rotating shaft 102. The illustrated sleeve ring 115 includes two portions 115a, 115b in FIG. 1. In particular, the sleeve 115 includes a rotating ring 115a that is configured to contact and rotate with the rotating shaft 102. In the illustrated embodiment, a spacer sleeve 115b is included as part of the sleeve 115. Of course, the sleeve ring 115 could be formed as a unitary piece or could include any number of pieces that are either joined together or otherwise held stationary relative to each other during operation (e.g., all pieces rotate together as one). While not shown specifically in FIG. 1, it shall be understood that the oleophobic coating can be applied to any radially outward surface of the sleeve ring 115. For example, the oleophobic coating can be applied on a radial outward surface of the sleeve ring such as surface 137. The same is true in later disclosed embodiments.

The illustrated cartridge 118 also includes what is sometime referred to as a separation seal 119. Of course, the separation seal 119 is not required as part of dry gas seal in general and may be a separate element that is joined to a dry gas seal The separation seal can serve to prevent or reduce oil or other lubricants from a bearing (not shown) disposed in the bearing cavity 108 from entering the first seal 110.

It shall be appreciated that the separation seal 119 is not required in certain embodiments. That is, embodiments herein do not require that the separation seal as part of the cartridge 118. Further, as shown in one or more of the following embodiments, if present, the separation seal 119 need not be adjacent the first seal 110 and one or more other seals could be provided between the first seal 110 and the separation seal 119.

Assuming that the process gas in the process cavity 106 is under pressure, all components of the dry gas seal assembly 100 are urged in the direction toward thrust rings 121 and 125 during operation. Axial movement of the sleeve ring 115 relative to the rotating shaft 102 is limited by a shaft thrust ring 125 received in a groove in the rotating shaft 102. Axial movement of the stator 117 is limited by stator thrust ring 121 received in a groove in the housing 104.

In the above example, it should be understood that the shaft thrust ring 125 can be fixed relative to the sleeve ring 115 so that the two elements rotate together. Also, for sake of completeness, it shall be understood that other elements can be attached to the sleeve 115 to provide support or other functions but are not specifically described herein. One optional example is a mating ring position fixing element 115c.

The sleeve ring 115 carries and otherwise mates rotating or mating ring 114 to the rotating shaft 102 That is, the sleeve ring 115 being mated to the rotating shaft 102 allows the mating ring 114 to also rotate with the 102. The mating ring 114 can include one or more grooves (not shown) formed on a face thereof.

During operation, gas present in the process cavity 106, which can reach pressures of 6,500 PSI-G (450 BAR-G) or above, is sealed from the bearing cavity 108 and from the environment by the interaction of the mating ring 114 and a primary ring 116. The primary ring 116 can also be referred as stationary ring as it does not rotate with the shaft and is thus, generally or completely, rotationally stationary relative to the housing during operation. Reference numeral 113 identifies the location of the seal interface formed between the mating ring 114 and the primary ring 116.

As will be understood by the skilled artisan, primary ring 116 is axially movable relative to the housing 104 during operation such that a controlled distance may be maintained between the mating ring 114 and the primary ring 116 at the seal interface 113. In the illustrated embodiment, a spring force is applied to the primary ring 116 by one or more biasing members 138 disposed between the retainer ring 117a and the primary ring 116.

During operation, a flow of treated process gas sometimes referred to as "sealing gas" is provided to the into the seal chamber 112. The sealing gas is shown generally by arrows 150 that identify the path taken by the gas through the dry gas seal assembly 100 and it enters via a sealing gas inlet 152. The sealing gas can be at a pressure that is greater than the pressure of the process gas in the process cavity 106. This pressure differential keeps untreated process gas from entering the first seal 110 and allows for at least some of the sealing gas to reenter the process cavity 106. Typical processing of process gas create sealing gas can include one or both of filtering and heating the process gas.

Rotation of the mating ring 114 due to its connection to the rotating shaft 102 will cause some of the sealing gas in the seal chamber 112 to be drawn from an outer diameter of the mating ring 114 into the groves formed therein. The shape of the grooves is optimized to enhance seal performance. As is known in the art, the grooves typically are machined only to the radial midpoint of the face of the mating ring 114 and have a very shallow depth of only a few microns. The grooves are shaped to have a tip such that gas enters the grooves is compressed because of the volume reduction at the tips. The area of slightly higher gas pressure creates a pressure dam and results in a so-called "lift off" resulting in physical separation of the primary and mating rings 114, 116. As such, in operation, gas flows over the dam area (between the primary and mating rings 114, 116) to a low pressure side 160 of the seal interface 113. Gas that passes through the seal interface can exit the dry gas seal assembly 100 via a vent 174 in the compressor housing 104. As shown, the vent 174 is fluid communication with a retainer ring vent passage 176 formed in the retainer ring 117b. Of course, the vent 174 could be coupled to other vent passages in different embodiments.

To allow for the above described lift off, a carrier ring 170 is provided as a means for allowing the required movement. The carrier ring 170 is coupled to the retainer ring 117a by the biasing members 138. The biasing members 138 can be a singular element or composed of a plurality elements. The biasing members 138 are comprised of one or more springs in one embodiment.

During operation, as described above, pressure in the process cavity 106 as well as heat can cause the rotating shaft 102 to move or expand axially. The biasing members 138 can allow for the primary ring 116 to keep a constant distance during operation between itself and the mating ring 114 even as the mating ring 114 moves axially due to such movement of the rotating shaft 102.

To ensure that sealing gas 150 cannot travel around the seal interface 113, one or more radial seals may be provided. The seals may be formed of a polymer or an elastomer and one example of such a seal is a lip seal. In FIG. 1 the seal is illustrated as a lip seal but that is by way of example only and not meant to be limiting. As illustrated, a first seal 172 can be provided between retainer ring 117a and the carrier ring 170. The first seal 172 is fixed relative to the retainer ring 117a in one embodiment. This first seal 172 can be arranged such that the sealing gas 150 causes it to expand when gas impinges upon. The first seal 172 is, thereby, a so-called contact seal. As the primary ring 116 moves (either due to lift off or shaft movement) the carrier ring 170 will move relative to the first seal 172.

In operation, as pressurized gas is used, it is not uncommon for at least some of the sealing gas to bypass the seal interface 113 and travel such it contacts outer regions or diameters or the carrier ring 170. An example of such an outer location is shown by sealing surface 200 of carrier ring 170. The escaping gas can form liquid and eventually solid deposits on this surface. These deposits can create a "hang up" in the sliding interface of the carrier ring 170 and the first seal 172 (e.g., at the interface of the sealing surface 200 and the first seal 172). In some instances, the hang up may create increased friction between the sealing surface 200 and the first seal 172 such that the closing force of the biasing members 138 is insufficient to overcome the friction forces and cannot force the primary ring 116 toward the mating ring 114 to keep the desired gap during operation or to close the seal interface when the compressor is not operating.

According to one embodiment, such deposits may be reduced or avoided by applying an oleophobic coating to the sealing surface 200.

Figure 2:
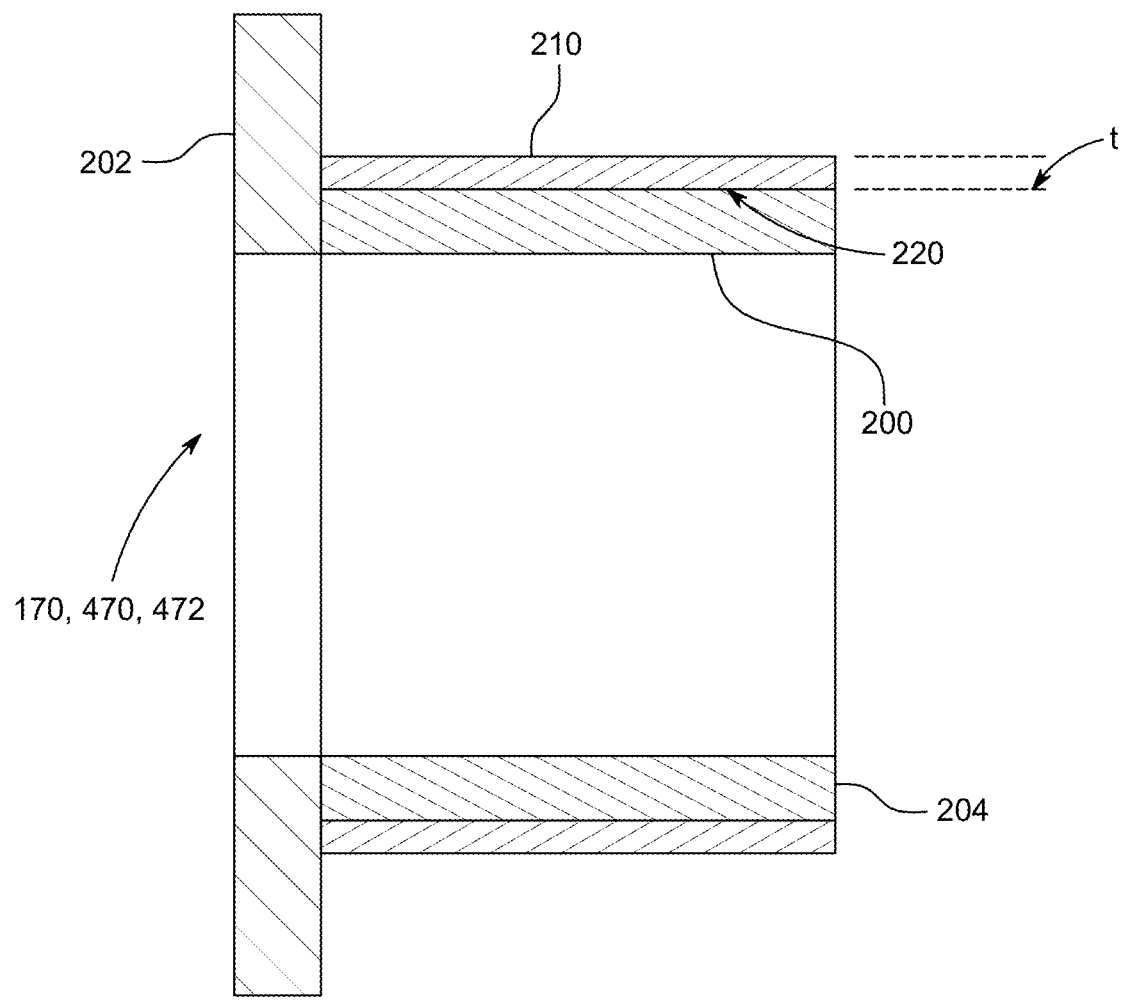
FIG. 2 is a cross-sectional view of a carrier ring having an oleophobic coating disposed on an outer diameter of a sealing surface.

Referring now to FIG. 2, an example of a carrier ring 170 is shown. The carrier ring 170 includes a primary ring carrying face 202, a rear face 204 and the sealing surface 200 that extends at least partially between the primary ring carrying face 202 and the rear face 204. With reference now to FIGS. 1 and 2, the primary ring 116 can be attached to the primary ring carrying face 202. In this manner, as the primary ring moves 116 moves, the carrier ring 170 also moves (e.g., during lift off). By applying an oleophobic coating 210 the sealing surface 200 deposits can be reduced and hang up of such movement can be avoided.

The coating 210 can be deposited in a variety of manners including, by hand or by vacuum deposition. In operation, the coating can be selected such that it provides a contact angle for droplets of 60 degrees or greater. In one embodiment, the coating can provides such a contact angle for at least 100,000 abrasion cycles. An example of such a coating includes Aculon Oleophobic Coatings from Caplinq BV. Of course, other coatings could be utilized.

In one embodiment, the coating 210 is provided such that it includes a thickness, t. In one embodiment, the thickness t is between 0.1 nanometer and 500 micrometers.

Figure 3A:
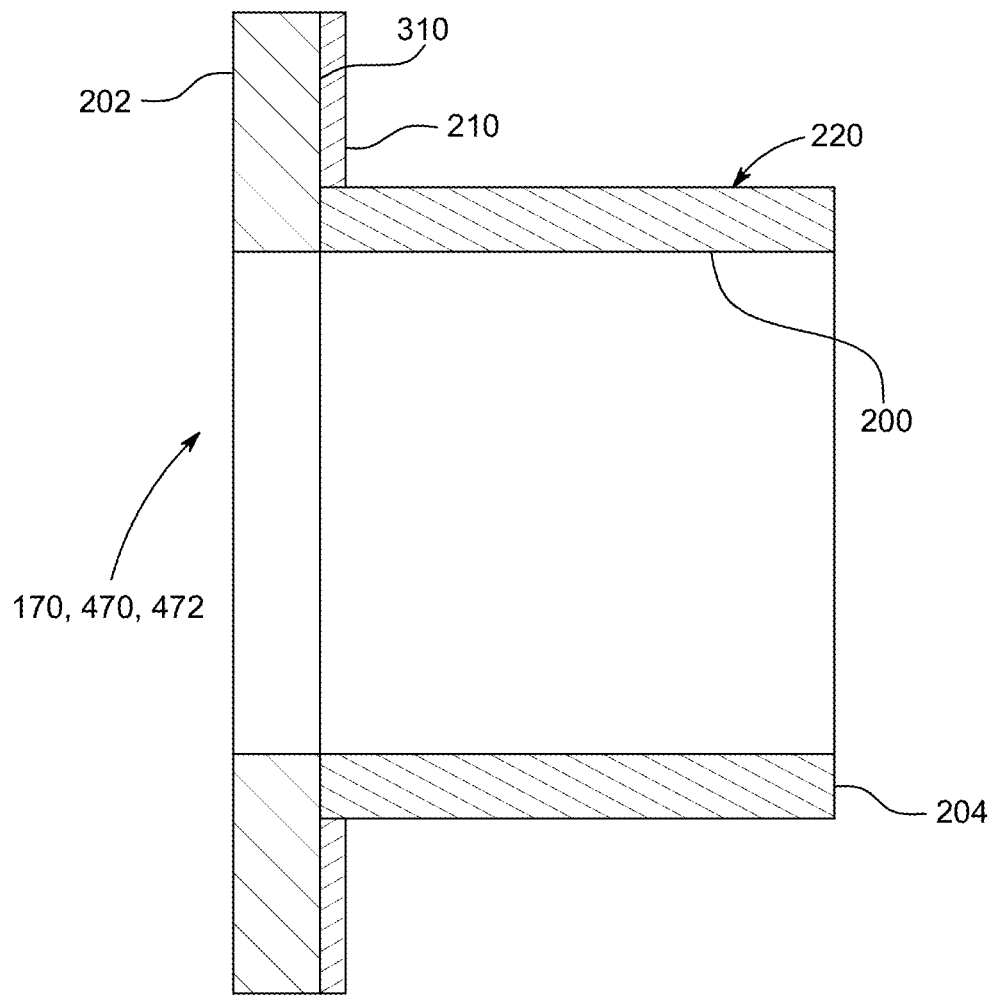
FIGS. 3A and 3B, respectively, are cross-sectional views of the carrier ring of FIG. 2 having an oleophobic coating disposed on a rear face of primary ring carrying face and on the rear face of the carrier ring.
Figure 3B:
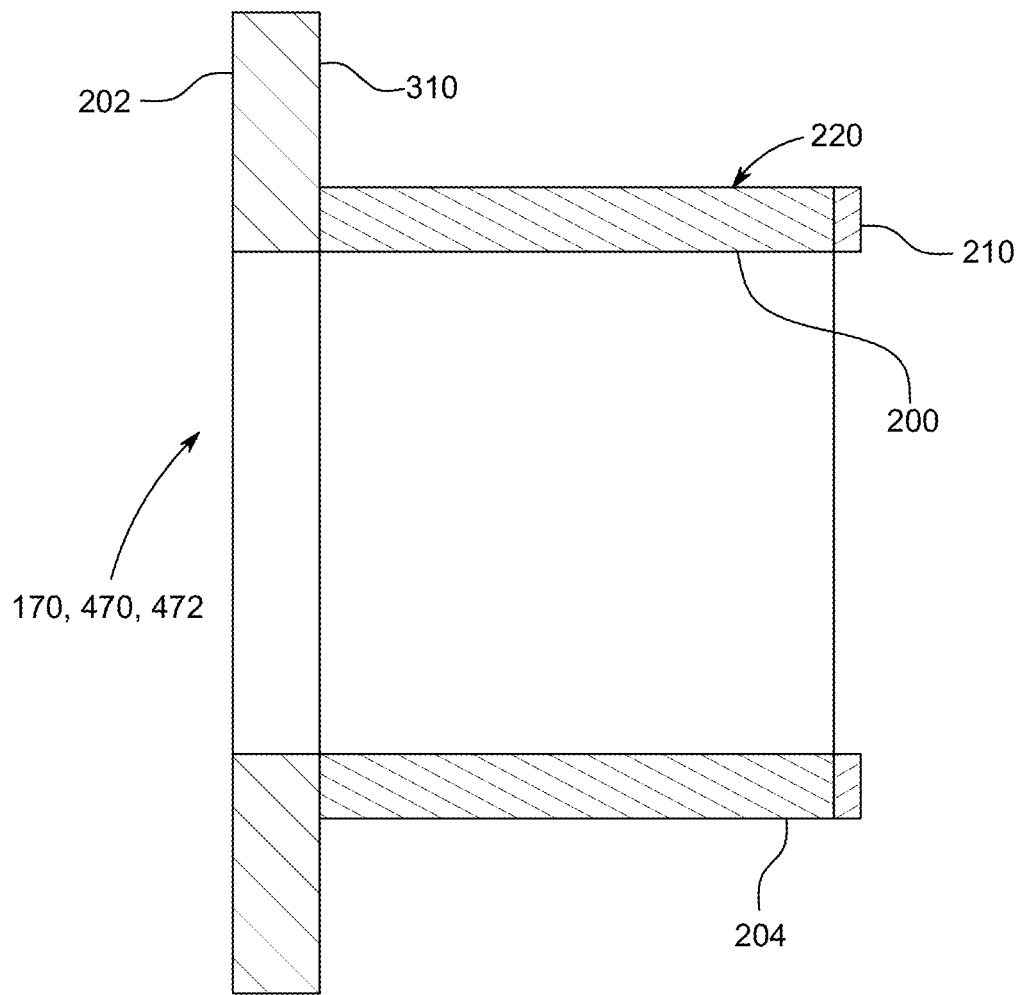

As will be understood, the location of the coating 210 is not limited to only the outer diameter 220 of the sealing surface 200. For example, and with reference to FIGS. 3A and 3B, the coating 210 can be located alternatively or in combination, on a rear face 310 of the primary ring carrying face 202 or on the rear face 204. As thus described, the skilled artisan will realize that the coating 210 can be applied to any or all of: the rear face 310 of the primary ring carrying face 202; the sealing surface 200; and the rear face 204; or any combination thereof. The type and thickness of the coating on each surface can the same as described above or different form each other. That is, in instances where the coating is on different surfaces, it can have different thickness or even be formed of a different material.

Referring back to FIG. 1, a flow of separation gas, typically an inert gas such as nitrogen ($N_2$), is provided to the separation seal 119 though a separation gas inlet 176. The separation gas and its path are shown by arrows 180. As illustrated, the separation gas 180 exits the dry gas seal assembly 100 via the vent 174 in the compressor housing 104. The flow of separation gas 180 through the separation seal 119 can prevent lubrication oil present in the bearing cavity 108 from entering the dry gas seal assembly 100. In one embodiment, the separation seal 119 can be a dual-segmented carbon ring seal designed to prevent the migration of bearing oil to the dry gas seal cartridge 118 on turbo-compressor equipment, such as a "Type 82" or a "Type 83" seal manufactured by John Crane, Inc. of Morton Grove, Ill.

As illustrated in FIG. 1, secondary leak paths for gases through seal assembly are blocked by radial compression seals between the cartridge 118 and the housing 104 or the rotating shaft 102. These seals are shown illustratively and not referred to individually herein. The arrangement and materials used for these seals can be optimized based on the application, for example, the operating pressures of the gas, as well as the chemical composition of the gas and/or the operating environment of the compressor. The radial seals may include O-rings, composite seal arrangements, such as advanced polymer seals surrounding seal carrier members, or any other appropriate type of seal.

As discussed above, during operation, a flow of treated process gas (sealing gas 150) is provided to one side of the seal interface 113 and the separation gas 180 is provided to the separation seal 119. The skilled artisan will realize that a properly controlled flow and temperature of the sealing gas and separation gas through the seal elements is essential to effective seal performance and durability. Even with such control a large amount of dry gas seals used in hydrocarbon environments can exhibit the above discussed deposits.

Thus, in one embodiment, any location in the dry gas seal assembly 100 this is contacted by a gas may benefit from application of the coatings discussed herein. For example, the coating could be applied to a rear face 188 of the retainer ring 117a. Further, the coating could be placed on locations of the separation seal 119.

Figure 4:
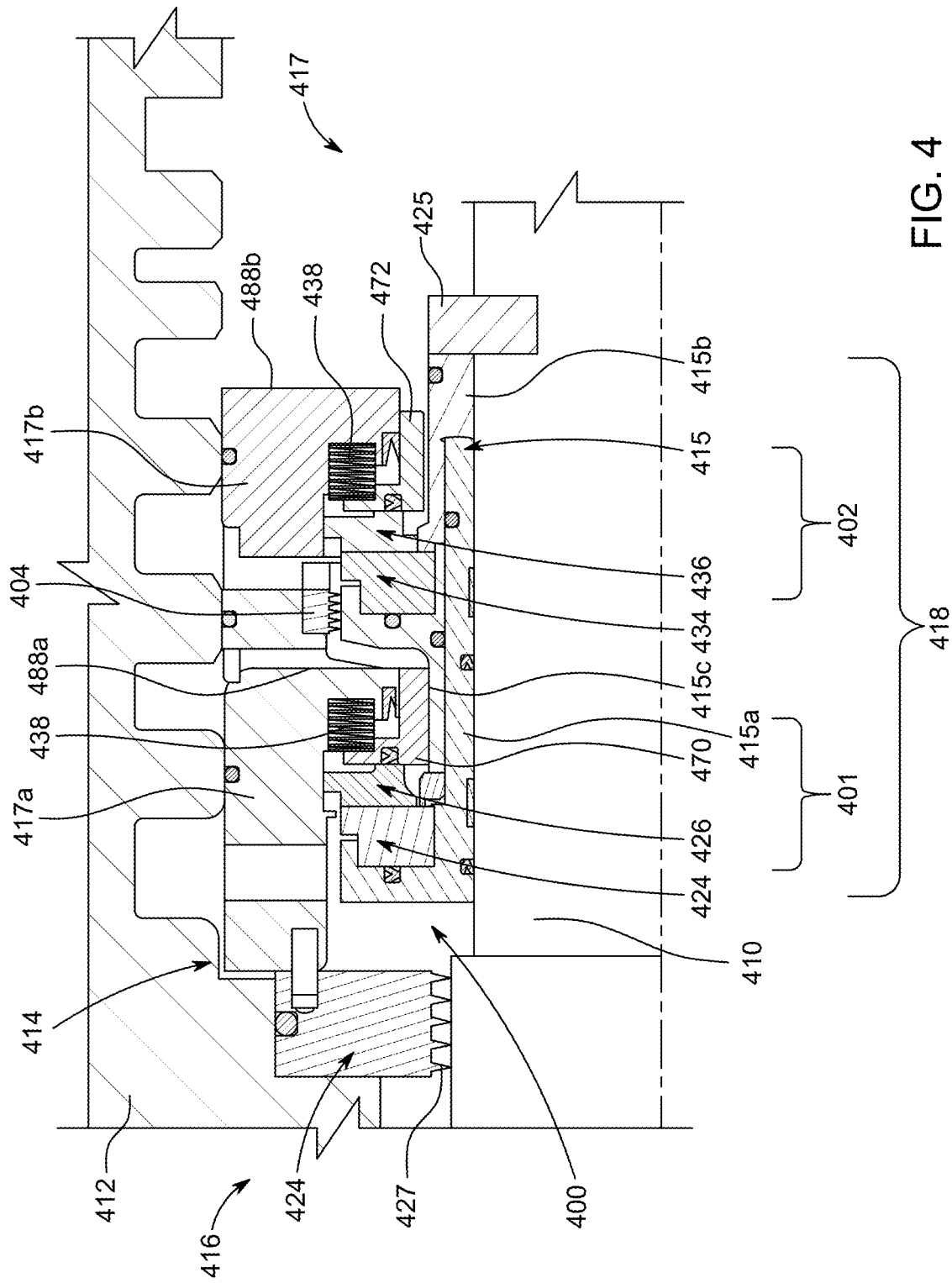
FIG. 4 is a cross-sectional view of a tandem dry gas seal disposed into a compressor housing.

FIG. 4 shows a dry gas seal assembly 400 that includes a first stage seal 401 and a second stage seal 402. It shall be understood that the combination of the first and second stage seal 401, 402 form what is commonly referred to as a tandem seal. The two seals are shown as being separated from one another by an optional interstage labyrinth 404. Each of the first and second stage seals 401, 402 work generally as described above.

At least a portion of the dry gas seal assembly 400 is positioned between a rotating compressor shaft 410 and a compressor housing 412 that can operate similar to compressor. A bore 414 (sometimes called a seal chamber) is formed in the compressor housing 412 that extends between the process cavity 416 and a bearing cavity 417 and defines an annular seal chamber into which the dry gas seal assembly 400 may be inserted. A shroud or labyrinth seal 424, which extends over a radially extending opening formed between the rotating compressor shaft 410 and the compressor housing 412, inhibits the free flow of process gas from the process cavity 106 into the bore 414. In this as in other embodiments, the shroud 424 can be a separate element from the dry gas seal assembly 400 or may be part of it depending on the context and setting. As illustrated, the shroud 424 is shown as a single element that includes a labyrinth 427 formed thereon but is could be composed of a combination of two or more separate elements.

The dry gas seal assembly 400 illustrated in FIG. 4 includes the first and second stage seals 401, 402. Typically the components of the first and second stage seals 401, 402 are preassembled into a cartridge 418 and then disposed in the bore 414. The cartridge 418 includes stator 417 that can be formed of one or more components and joined in a fixed relationship to one another as well as with the compressor housing 412 when installed. As shown, the stator 417 includes first and second retainer rings 417a, 417b.

The cartridge 418 can also include a sleeve ring 415 that can be formed of one or more components and that that is attached to the rotating shaft 410 such that it rotates with the rotating shaft 410. As above, the rotating shaft can be compressor shaft (rotor) or a shaft connected thereto. Rotation of the shaft 410 will cause the all portions of the sleeve ring to rotate as well as elements connected thereto (e.g., primary rings). The illustrated sleeve ring 415 includes three portions 415a, 415b, 415c In particular, the sleeve 415 includes a rotating ring 415a that is configured to contact and rotate with the rotating shaft 410. In the illustrated embodiment, a spacer sleeve 415b is included as part of the sleeve 415. The sleeve 415 also includes a second stage spacer 415c that defines the separation between the first and second seals 401, 401. Of course, the sleeve 415 could be formed as a unitary piece or could include any number of pieces that are either joined together or otherwise held stationary relative to each other during operation (e.g., all pieces rotate together as one).

Contrary to the above, the illustrated cartridge 418 of FIG. 4 does not include a separation seal. This is not required and such a seal could be provided as part of the cartridge 418. Axial movement of the sleeve ring 415 relative to the shaft 410 is limited by a shaft thrust ring 425 received in a groove in the shaft 410. Axial movement of the stator 117 is also limited by a thrush ring (not shown) that mates with the housing 412.

The sleeve ring 415 carries and otherwise mates the mating rings of the first and second seals 401, 402 to the rotating shaft 410. That is, the sleeve ring 415 being mated to the rotating shaft 410 allows the mating rings to also rotate with rotating shaft 410. The mating rings can include one or more grooves (not shown) formed on a face thereof.

The first stage seal 401 includes a first mating ring 424 carried by the sleeve ring 415 and the second stage seal 402 includes a second mating ring 434 carried by the sleeve ring 415 and, in particular, by the second stage spacer 415c thereof.

The first stage seal 401 also includes a first primary ring 426 carried by and moveable coupled to the first retainer ring 417a. To that end, the first stage seal includes a first carrier ring 470 connected by biasing members 438 disposed to the first retainer ring 417a. As discussed above, the biasing members 438 allow the first carrier ring 470 to move relative to the shaft 410 as well as the first mating ring 424 so that the first stage seal 401 can operate as desired. As above and with reference again to FIGS. 2 and 3A-3B, the first carrier ring 470 can include a primary ring carrying face, a rear face and a sealing surface extending between the primary ring carrying face and the rear face. A first primary ring 426 can fixed to a primary ring carrying face.

The second stage seal 402 also includes a second primary ring 436 carried by and moveable coupled to the second retainer ring 417b. To that end, the second stage seal includes a second carrier ring 472 connected by biasing members 438 disposed to the first retainer ring 417a. As discussed above, the biasing members 438 allow the second carrier ring 472 to move relative to the shaft 410 as well as the second mating ring 424 so that the second stage seal 402 can operate as desired. As above and with reference again to FIGS. 2 and 3A-3B, the second carrier ring 472 can include a primary ring carrying face, a rear face and a sealing surface extending between the primary ring carrying face and the rear face. A second primary ring 436 can fixed to a primary ring carrying face.

While not explicitly shown in FIG. 4 it shall be understood that any portion or either or both of the first and second carrier rings 470, 472 can include an oleophobic material disposed thereon.

As discussed above, during operation, a flow of treated process gas is provided to one side of the first stage seal 401. Also, that same gas or a different gas (e.g., a barrier gas) may be applied to the second stage seal 402. The skilled artisan will realize that a properly controlled flow and temperature of the sealing gas and barrier gas through the seals 401, 402 is essential to effective seal performance and durability. Even with such control a large amount of dry gas seals used in hydrocarbon environments can exhibit the above discussed deposits. Thus, in one embodiment, any location in either seal 401, 402 this is contacted by a gas may benefit from application of the coatings discussed herein. For example, the coating could be applied to a rear faces 488a, 488b of the retainer rings 117a, 117b.

An interstage labyrinth 404 can be disposed between the first and second stage seals 401, 402 in one embodiment. This labyrinth 404 can include an oleophobic material disposed thereon.

At present there are many operational dry gas seals in operation. The teachings herein can be applied to them as well. For example, and with reference now to FIG. 5, an existing dry gas seal can be repaired or serviced by having a part removed, coated oleophobic coating and replaced into the seal. Alternatively, a replacement part different than that removed from the seal and including an oleophobic coating thereon can be used to replace the removed part.

Figure 5:
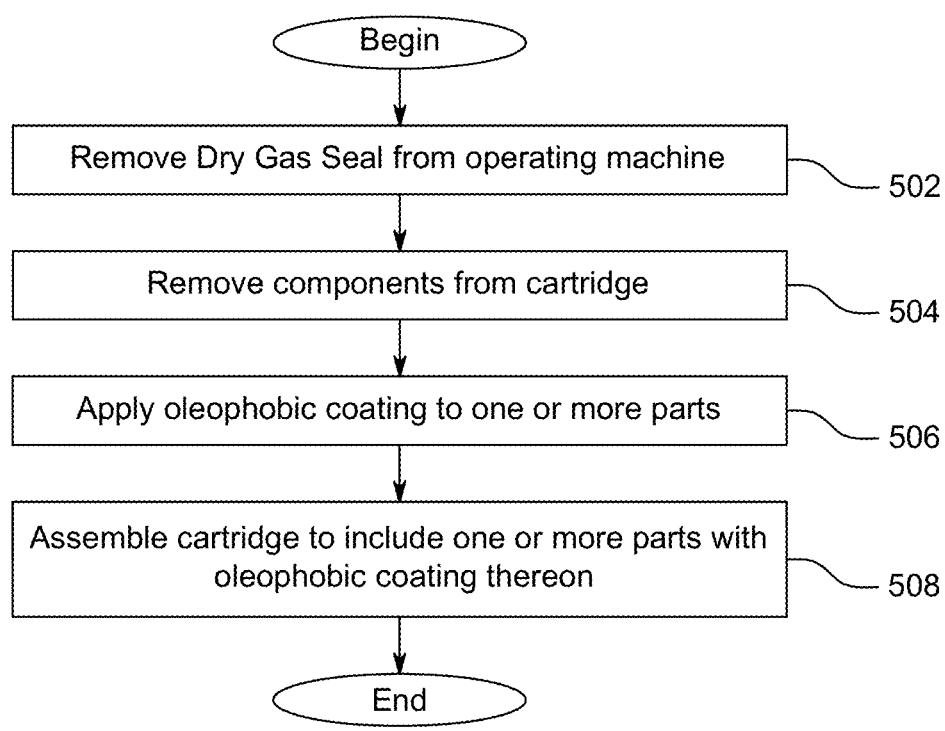
FIG. 5 is flow-chart showing a method of repairing a dry gas seal according to one embodiment.

While FIG. 5 includes several process steps, it shall be understood that not all need be performed by a single actor. The process begins at block 502 where a dry gas seal (including the above defined cartridges either with our without the separation seal) is removed from an operating machine. Examples of such machines include compressors but other machines fall within this definition.

At block 504 one or more parts of the cartridge are removed. This can include removing any of the stator, individual or all retainer rings, any or all carrier rings, and the sleeve ring or portions thereof. In some embodiments, the cartridge can be completely or almost completely disassembled at this stage.

At block 506 one or more dry gas seal parts can have an oleophobic coating applied to one or more surfaces thereof. This process can include applying the oleophobic coating to one or more of the removed components or to new components. In one embodiment, the oleophobic coating is disposed on the sealing surface of at least one carrier ring to form the treated carrier ring At block 508, the cartridge is reassembled such that least one of the parts discussed in reference to block 406 is included therein. That is, at block 408, a dry gas seal including at least one surface having an oleophobic coating is created. The cartridge can be reassembled outside of the machine or in the machine. In one embodiment, reassembly includes including the treated carrier ring in the cartridge.

In the above discussion, certain aspects have been illustrated in the context of a dry gas seals that include a balance diameter carrier (e.g., carrier ring 170). It shall be appreciated, however, that application of an oleophobic coating may find application in other types of dry seals. In such an aspect, the method of FIG. 5 can be applied to such a seal.

Figure 6:
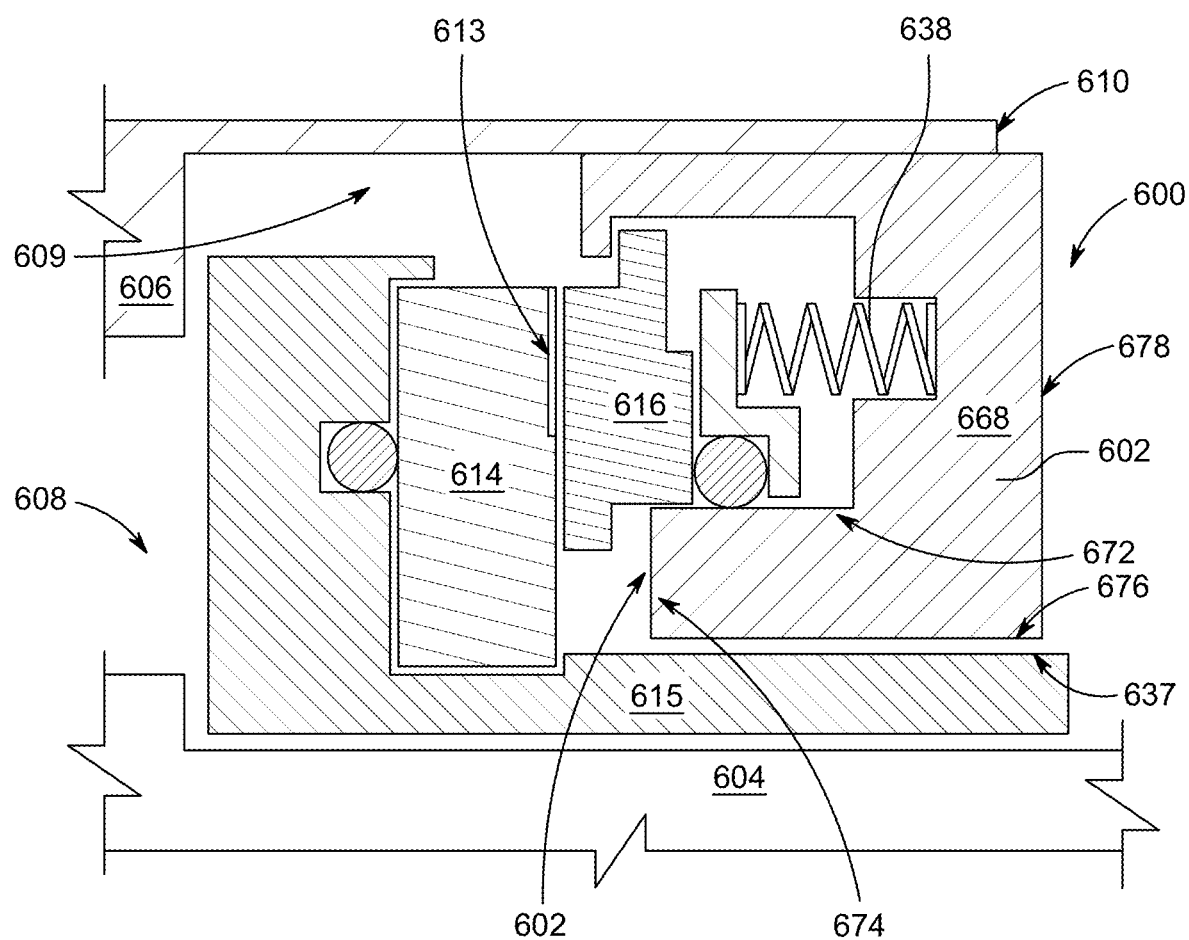
FIG. 6 is a cross-section of another embodiment of a dry gas seal.

In FIG. 6 an alternative type of dry gas seal assembly 600 is shown that includes a retainer 602. As shown, the retainer 602 is a seal gland plate. Such a seal gland plate can, in some instance, be bolted or otherwise secured to a body of a compressor or other high pressure device that needs a seal formed around a rotating shaft such as shaft 604.

Similar to the above, at least a portion of the dry gas seal assembly 600 is positioned between a rotating compressor shaft 604 and a compressor housing 606. The rotating compressor shaft 604 is generally part of a compressor and is operably coupled to a compressor impeller (not shown) disposed in a process cavity 608 of the compressor The compressor housing 606 includes a bore 609 formed in it that extends between the process cavity 608 and an outer wall 610 of the housing 606. The seal assembly 600 is inserted into this bore 609. The process cavity 608 includes the gas (typically a hydrocarbon) being compressed by the compressor. That gas is referred to as process gas herein and, as above, is used to create the gas film between the rotating (mating) and stationary (primary) rings.

The assembly 600 can also include a sleeve ring 615 that can be formed of one or more components and that that is attached to the rotating shaft 604 such that it rotates with the rotating shaft 604. This illustrated sleeve ring 615 is shown as a unitary piece but could include any number of pieces that are either joined together or otherwise held stationary relative to each other during operation (e.g., all pieces rotate together as one). While not shown specifically in FIG. 6, it shall be understood that the oleophobic coating can be applied to any radially outward surface of the sleeve ring 615. For example, the oleophobic coating can be applied on a radial outward surface of the sleeve ring such as surface 637. The same is true in later disclosed embodiments.

The sleeve ring 615 carries and otherwise mates rotating or mating ring 614 to the rotating shaft 604 That is, the sleeve ring 615 being mated to the rotating shaft 604 allows the mating ring 614 to also rotate with the 604. The mating ring 614 can include one or more grooves (not shown) formed on a face thereof and operates relative to the primary ring 616 as discussed above based on process gas that is introduced into the bore 609

As above, during operation, gas present in the process cavity 608, which can reach pressures of 6,500 PSI-G (450 BAR-G) or above, is sealed from the environment by the interaction of the mating ring 614 and a primary ring 616. The primary ring 616 can also be referred as stationary ring as it does not rotate with the shaft and is thus, generally or completely, rotationally stationary relative to the housing 606 during operation.

As will be understood by the skilled artisan, primary ring 616 is axially movable relative to the housing 606 during operation such that a controlled distance may be maintained between the mating ring 614 and the primary ring 616 at the seal interface 613. In the illustrated embodiment, a spring force is applied to the primary ring 616 by one or more biasing members 638 that are attached to the retainer 602. As shown, the primary ring 616 is connected to pusher ring 660. A sealing element 662 is provides a seal between the pusher ring 660/primary ring 616 combination and an extension 670 of the retainer ring 602. The seal can be formed of a polymer or elastomer and is shown as an O-ring but other types of seal could be used.

The extension 606 generally extends from the main body 668 of the retainer 602. The extension 670 includes a radially outward surface 672, an axially inward surface 674 and a radially inward surface 676. The terms inward/outward for the radially outward surface 672 and the radially inward surface 676 are taken relative to the shaft 604. The term axially inward for the axially inward surface 674 refers to a proximity to the process cavity 608 as compared to the main body 678 when the seal assembly 600 is inserted into the cavity 609. Any of the radially outward surface 672, the axially inward surface 674 and the radially inward surface 676 can have an oleophobic coating applied thereon in the manner described above.

The main body 668 can also include an axially outward surface 678. The axially outward surface 678 can also have an oleophobic coating applied thereon in the manner described above.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A dry gas seal to seal process gas in a compressor that includes a rotating shaft, the dry gas seal comprising:
    a mating ring that can be coupled to the rotating shaft to rotate with the rotating shaft;
    a primary ring that defines a seal interface with the mating ring;
    a retainer ring that can be fixedly attached to the compressor; and
    a carrier ring moveably coupled to the retainer ring, the carrier ring including a primary ring carrying face attached to the primary ring, a rear face and a sealing surface extending between the primary ring carrying face and the rear face;
    a sealing element disposed between the retainer ring and the carrier ring;
    wherein the sealing surface includes an oleophobic coating disposed thereon and that is exposed to sealing gas at a pressure that is higher than a pressure of gas in the compressor, and wherein the sealing element slides along the oleophobic coating and relative to the carrier ring as the carrier ring moves relative to the retainer ring.

2. The dry gas seal of claim 1, further comprising:
    a biasing member that movably couples the carrier ring to the retainer ring.

3. The dry gas seal of claim 2, wherein the sealing element is a polymer or elastomer seal.

4. The dry gas seal of claim 2, wherein a portion of the retainer ring includes the oleophobic coating disposed thereon.

5. The dry gas seal of claim 1, further comprising:
    a sleeve ring that is coupled to the rotating shaft and carries the mating ring.

6. The dry gas seal of claim 5, wherein a radially outward surface of the sleeve ring includes the oleophobic coating disposed thereon.

7. The dry gas seal of claim 1 in combination with a separation seal, the separation seal including the oleophobic coating disposed thereon.

8. The dry gas seal of claim 1, in combination with a compressor, wherein the dry gas seal is disposed in a bore formed in a housing of the compressor and provides process gas received through the compressor housing to the primary ring.

9. A dry gas seal to seal process gas in a compressor that includes a rotating shaft, the dry gas seal comprising:
    a first stage seal including:
        a first mating ring that can be coupled to the rotating shaft to rotate with the rotating shaft;
        a first primary ring that forms a first seal interface with the first mating ring;
        a first retainer ring that can be fixedly attached to the compressor; and a first carrier ring moveably coupled to the first retainer ring, the first carrier ring including a first primary ring carrying face attached to the first primary ring, a first carrier ring rear face and a first carrier ring sealing surface extending between the first primary ring carrying face and the first carrier ring rear face;

a first sealing element disposed between the first retainer ring and the first carrier ring;

wherein the first carrier ring sealing surface includes an oleophobic coating disposed thereon and that exposed to sealing gas at a pressure that is higher than a pressure of gas in the compressor, and wherein the first sealing element slides along the oleophobic coating and relative to the first carrier ring as the first carrier ring moves relative to the first retainer ring; and a second stage seal including:
a second mating ring that can be coupled to the rotating shaft to rotate with the rotating shaft;
a second primary ring that forms a second seal interface with the second mating ring;
a second retainer ring that can be fixedly attached to the compressor; and
a second carrier ring moveably coupled to the second retainer ring, the second carrier ring including a second primary ring carrying face attached to the second primary ring, a second carrier ring rear face and a sealing surface extending between the second primary ring carrying face and the rear face;
wherein the first carrier ring sealing surface includes an oleophobic coating disposed thereon.

10. The dry gas seal of claim 9, wherein the first carrier ring sealing surface includes the oleophobic coating, the dry gas seal further comprising:
a first biasing member that movably couples the first carrier ring to the first retainer ring.

11. The dry gas seal of claim 10, wherein the first sealing element is a polymer or elastomer seal.

12. The dry gas seal of claim 10, wherein the second carrier ring sealing surface includes the oleophobic coating, the dry gas seal and further comprising:
a second biasing member that movably couples the second carrier ring to the second retainer ring; and
a second sealing element disposed between the second retainer ring and the second carrier ring that contacts the oleophobic coating disposed on the second carrier ring sealing surface.

13. The dry gas seal of claim 12, wherein the second sealing element is a polymer or elastomer seal.

14. The dry gas seal of claim 9, further comprising:
a labyrinth seal disposed fluidly between the first seal and the second seal.

15. The dry gas seal of claim 14, wherein the labyrinth seal includes the oleophobic coating disposed thereon.

* * * * *